United States Patent
Poola et al.

(10) Patent No.: US 8,516,567 B2
(45) Date of Patent: Aug. 20, 2013

(54) DISTRIBUTED FIREWALLING IN A WIRELESS COMMUNICATION NETWORK

(75) Inventors: Jeelan Poola, Karnataka (IN); Somesh Agrawal, Karnataka (IN)

(73) Assignee: Motorola Solutions, Inc., Schaumburg, IL (US)

( * ) Notice: Subject to any disclaimer, the term of this patent is extended or adjusted under 35 U.S.C. 154(b) by 41 days.

(21) Appl. No.: 13/306,352

(22) Filed: Nov. 29, 2011

(65) Prior Publication Data

US 2013/0139243 A1   May 30, 2013

(51) Int. Cl.
*H04L 29/12* (2006.01)
*H04L 9/12* (2006.01)

(52) U.S. Cl.
USPC ............ 726/11; 380/270; 726/28; 726/29

(58) Field of Classification Search
None
See application file for complete search history.

(56) References Cited

U.S. PATENT DOCUMENTS

| | | | |
|---|---|---|---|
| 2007/0025246 A1* | 2/2007 | Pirzada et al. | 370/230 |
| 2008/0112363 A1* | 5/2008 | Rahman et al. | 370/331 |
| 2010/0318554 A1* | 12/2010 | Walker et al. | 707/769 |

* cited by examiner

*Primary Examiner* — Venkat Perungavoor
(74) *Attorney, Agent, or Firm* — Brian M. Mancini

(57) ABSTRACT

A method and system for distributed collaborative firewalling in a wireless wide area communication network including a plurality of controllers, comprises a binding table that is built by the controller in response to receiving identifiers of wireless clients being served by the controller, where the binding table lists the wireless clients associated with each access port under control of the controller. A processor of the controller is operable to apply stateless firewalling on wireless communication traffic from a wireless client using the binding table, and applying, by each access port, stateful firewalling on the wireless communication traffic from the wireless client.

12 Claims, 6 Drawing Sheets

DISTRIBUTED FIREWALLING IN A WIRELESS COMMUNICATION NETWORK

FIELD OF THE DISCLOSURE

The present invention relates generally to wireless communication networks, and more particularly to firewalling in a wireless communication network.

BACKGROUND

The advent of IEEE 802.11n wireless local area communication networks (WLAN), and in the near future gigabit WLAN networks, will require that older existing centralized switching architecture will need to be replaced with controllers and "thin" WiFi access ports having a new distributed architecture where access points (APs) are only managed by controllers. In this new architecture, the APs are configured to handle traffic themselves (bridging/routing of wireless-to-wired communications and vice versa), which is better suited for scaling to IEEE 802.11n with its higher throughputs as it will remove the bottleneck of controllers in central switching.

However, this new architecture poses new challenges when it comes to firewalling user traffic at different APs and controllers, particularly when a wireless client is roaming. Specifically, in case of tunneled-bridging mode for a WLAN, the user traffic from the wireless-to-wired network is statefully firewalled at both the AP and the controller. In this case, migrating a stateful firewall for the AP and controller, while a wireless client is roaming, without dropping the communication session becomes problematic.

As is known in the art, a firewall can be configured as either stateless or stateful. Stateless firewalls observe data traffic, and block packets based on source and destination addresses or other parameters. Stateless firewalls are not aware of traffic patterns or data flows. A stateless firewall uses simple rules to test packets and has no regard as to whether a source of the packets can be trusted. In contrast, stateful firewalls observe data traffic streams from source to destination. They are aware of traffic patterns or data flows and can implement various security functions including tunnels and encryption. A stateful firewall provides a level of consideration as to whether a source of the packets can be trusted.

In a system deployment where all controllers and APs are physically co-located on the same virtual local area network (VLAN), it is imperative that tunneled WLAN traffic is effectively load balanced across all available controllers in the deployment. Accordingly, when wireless mobile clients roam from one AP to another, firewall flow (or firewall-session) migration is presently provided from the old AP to the new AP to make sure that any communication sessions do not break during the roam. These firewall flows are migrated only between APs (i.e. firewall flows are not migrated to a controller that is bridging tunneled WLAN traffic from the wireless-to-wired communication network). At present, this is not an issue because there can only be one controller (typically an extended VLAN switch) that handles tunneled WLAN traffic bridged between the wireless-to-wired communication network, and these have always been stateful flows.

However, when traffic is load-balanced across multiple controllers, if a wireless client roams from a first AP that is tunneling WLAN traffic to a first controller, to a second AP that is tunneling WLAN traffic to a second controller, firewall flows will have to be migrated to the second controller as well. In addition, if there is a communication session between two mobile wireless clients connected to two different APs controlled by two different controllers, and the wireless clients both roam at the same time in reverse directions, then each AP will try to migrate flows to the other AP and the two controllers in between. So all in all flows have to be migrated to two APs and two controllers to make sure the communication sessions do not drop.

In another example, if two mobile wireless clients connected to the same AP roam away from the AP to two different APs, then the old AP will need to migrate flows of each wireless client to one new AP and two controllers. In total each flow related to the conversation between the two wireless clients will be migrated to six devices, ((one new AP and two controllers)*2 (number of clients roaming)). This makes things extremely complicated and greatly increases the probability of connections breaking during a client roam. Hence a simpler and more intuitive solution is necessary.

Any delay in migrating firewall flows can cause serious trouble in mobile clients if traffic cannot pass through network devices because of the absence of firewall flows. For example, SIP calls would suffer the most, followed by TCP connections—both of these types of connections can break, which leads to a bad user experience. Network deployment issues have already been encountered with the current migration to only two APs. Therefore, it is envisioned that the migration to four network devices is most likely going to make things worse.

Accordingly, there is a need for a new technique for firewalling in distributed networks, and in particular for traffic is already statefully firewalled at the edge of the network. It would also be of benefit if the new technique could make better decisions when handling tunneled WLAN traffic from network devices when mobile clients roam.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
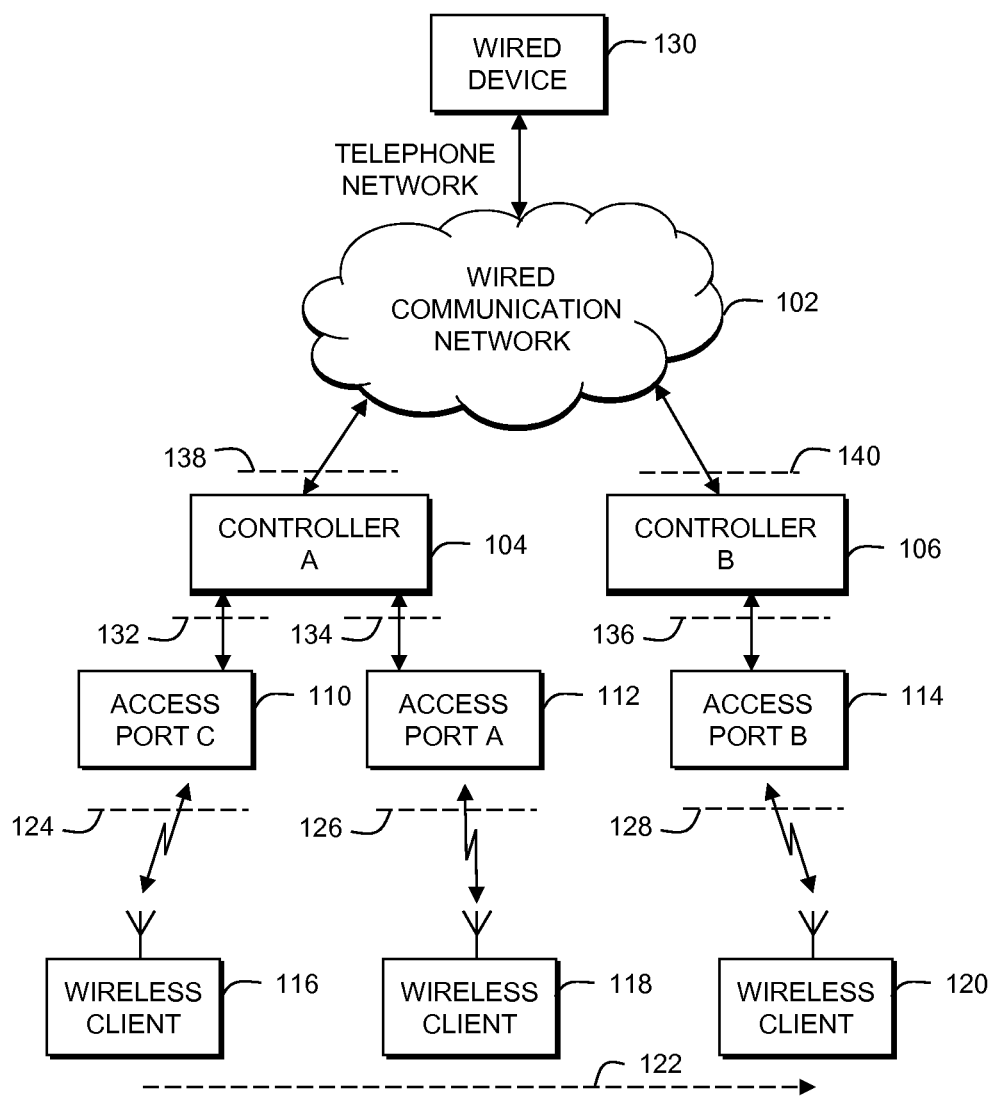
FIG. 1 is a simplified block diagram of a system, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A system and method is described that a new technique for firewalling in distributed networks having multiple controllers, and in particular for traffic that is already statefully firewalled at the edge of the network, where flow migration from one access port (AP) to another can be readily accomplished. The present invention also provides better decisions when handling tunneled WLAN traffic bridged from wireless devices to wired devices when a mobile client roams.

FIG. 1 is a block diagram depiction of a system for distributed collaborative firewalling in a wireless communication network, in accordance with the present invention. A plurality of network entities are shown, which can provide communications with a wireless client 116, 118, 120. The network entities can include a plurality of switches or controllers 104, 106, and a plurality of wireless access ports (APs) 110, 112, 114, all connected in wired and/or wireless configurations. In practice, each controller can be connected to an external wired communication network 102, such as the Internet in order to communicate with wired remote wired devices 130. Alternatively, the access ports could be directly connected to the wired communication network 102. The controllers can be coupled to the wireless access ports 110, 112, 114 defining a wireless local area network (WLAN), for example. A wireless client can undertake Wireless Network Management Protocol (WNMP) roaming 122 within the WLAN, while the controllers and access ports control communications with the client. During roaming, communications the wireless client are handed off from one access port to another as the wireless client traverses the service areas of the respective access ports 110, 112, 114 along its route 124.

The wireless communication network can include local and wide-area networks, or other IEEE 802.11 wireless communication system, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

Various entities are adapted to support the inventive concepts of the embodiments of the present invention. Those skilled in the art will recognize that FIG. 1 does not depict all of the equipment necessary for system to operate but only those system components and logical entities particularly relevant to the description of embodiments herein. For example, routers, controllers, switches, access points/ports, and wireless clients can all includes separate communication interfaces, transceivers, memories, etc. all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

Referring back to FIG. 1, a wireless client 116, 118, 120 is able to communicate with any one of a plurality of access ports 110, 112, 114 within the WLAN. The access ports in the WLAN can be under the control of multiple controllers 104, 106 of the WLAN. Each access port provides a firewall 124, 126, 128 for its communications with a wireless client. In addition, each controller provides a second firewall 132, 134, 136 for the communication flow with the wireless client. The present invention provides that firewall flow migration is not required among the controllers 104, 106 when the controllers are handling tunneled WLAN traffic bridged between wireless and wired devices, as will be detailed below. It should be noted that either of these controllers 104, 106 can be utilized as a designated extended VLAN switch (DEVS).

In accordance with the present invention, each controller builds a wireless client table that maintains information about an identifier, e.g. a given Media Access Control (MAC) address, of the wireless client along with the wireless client's currently associated AP, i.e. a MAC/AP binding table. This table can be built using WNMP-roam notifications sent by each AP whenever a wireless client newly associates with them. The roam notification message contains fields identifying the presently serving access port as well as the identifier of the wireless client being served. Alternatively, the identifier can be a Mesh Interconnection Network Technology (MINT) header which identifies a packet coming from a particular wireless client. However, in this alternative case a packet may not be sent by a client immediately after associating with an AP, which can delay the building of the binding table.

Using this binding table, a controller will decide to perform only stateless firewalling for packets from sources in the binding table. In particular, a processor of each controller can implement the logic scenarios described below to permit or deny traffic packets from migrating wireless clients by applying stateless firewalling on such packets where the wireless client is not directly associated with an on-board radio of the controller itself (bypassing any AP). By creating these stateless flows, the present invention does not drop any packets if they are out-of-state, and always allows such packets (so long as the access control list allows them), thereby avoiding the need for flow migration. It should be noted that purely wired-to-wired traffic is always firewalled statefully at the controllers.

In a first embodiment of the present invention, if a wireless client 116 is associated with an AP 110, and is communicating with a wired client 130 (e.g. a wired personal computer) through a wired communication network 102 (e.g. the Internet), the firewall flow 124 on the AP is stateful and the firewall flow 132 on the controller is stateless.

Figure 2:
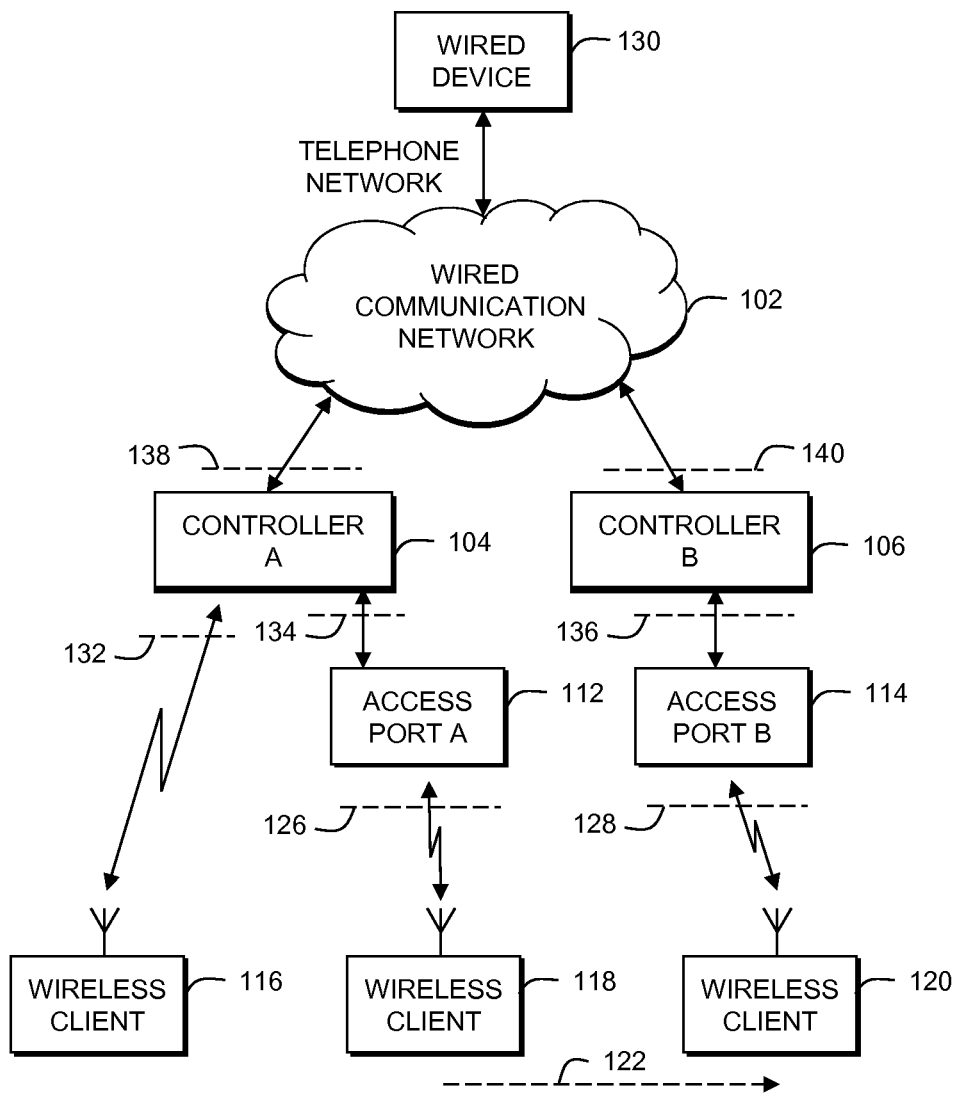
FIG. 2 is a simplified block diagram of one embodiment, in accordance with the present invention.

Referring to FIG. 2, in one embodiment of the present invention, if a wireless client 116 is directly associated with (an on-board radio or port of) the controller 104 (bypassing an AP), and is in communication with a wired client 130 through a wired communication network 102, the firewall flow 132 on the controller is stateful.

Figure 3:
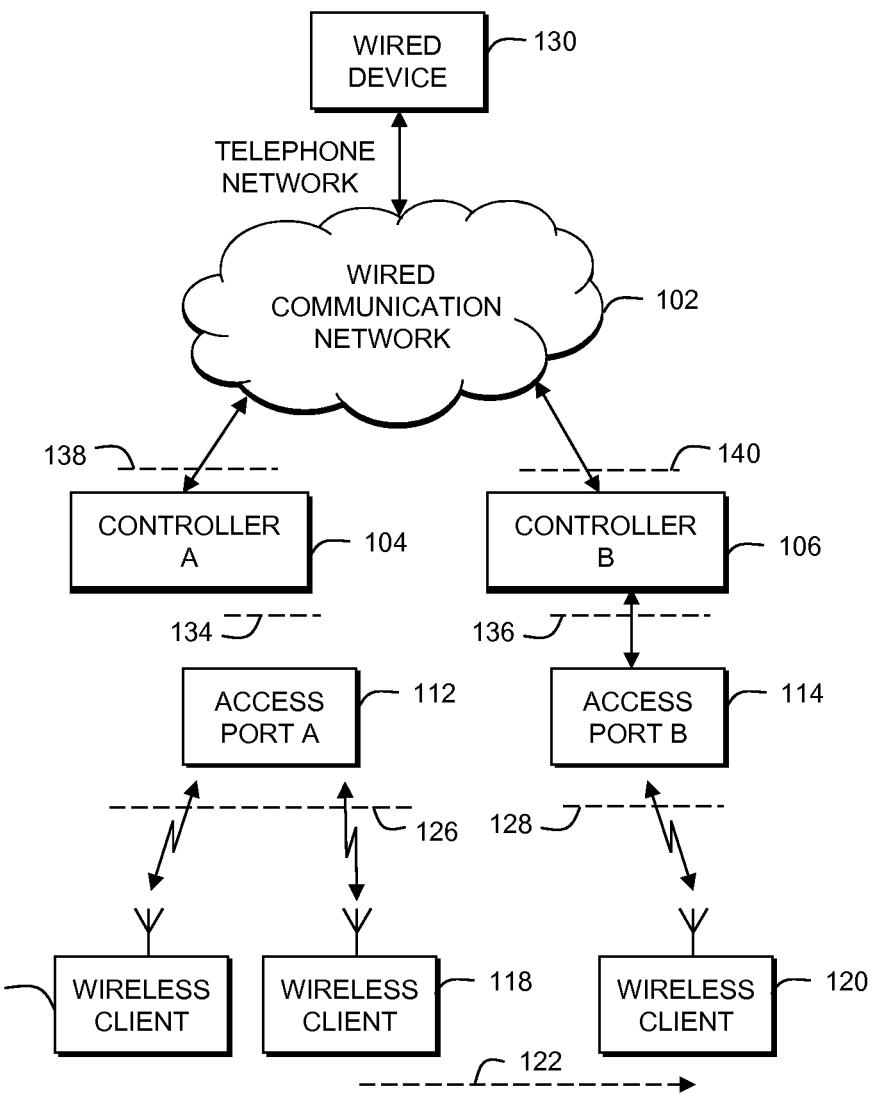
FIG. 3 is a simplified block diagram of another embodiment, in accordance with the present invention.
Figure 4:
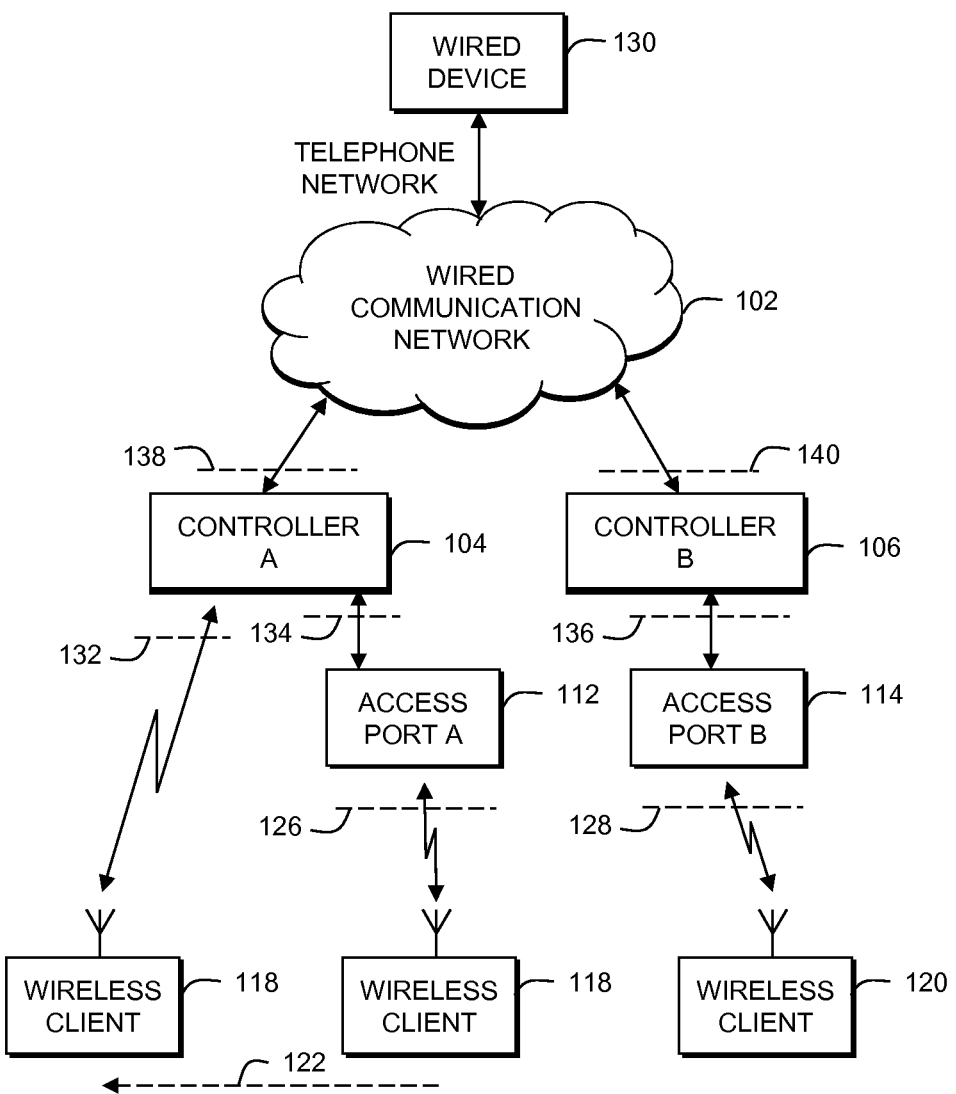
FIG. 4 is a simplified block diagram of yet another embodiment, in accordance with the present invention.

Referring to FIG. 3, in another embodiment of the present invention, if a wireless client 116 is associated with an AP 112, and is wirelessly communicating with another device 118 on the same AP 112, the firewall flow 126 on the AP is stateful. In this case, there is no traffic going to the controller.

In yet another embodiment of the present invention, only stateful firewalling 138, 140 is applied for any wired devices 130 connected to a controller 104, 106 through a wired communication network 102.

In still another embodiment of the present invention, if a wireless client 118 is associated with AP A 112 of controller A 104, and is wirelessly communicating with another device 120 associated with AP B 114 of controller B 106, the firewall flow 126, 128 on both APs is stateful, and the firewall flows 134, 136 on both controllers will be stateless.

In yet another embodiment of the present invention, whenever a wireless client 118, for which a controller was doing stateless firewalling 134, connects/roams 122 directly onto an on-board radio or port of the controller 104, the controller will automatically make all its firewall flows 132, 134 stateful by dropping all stateless firewall flows and installing the migrating stateful firewall flows.

Figure 5:
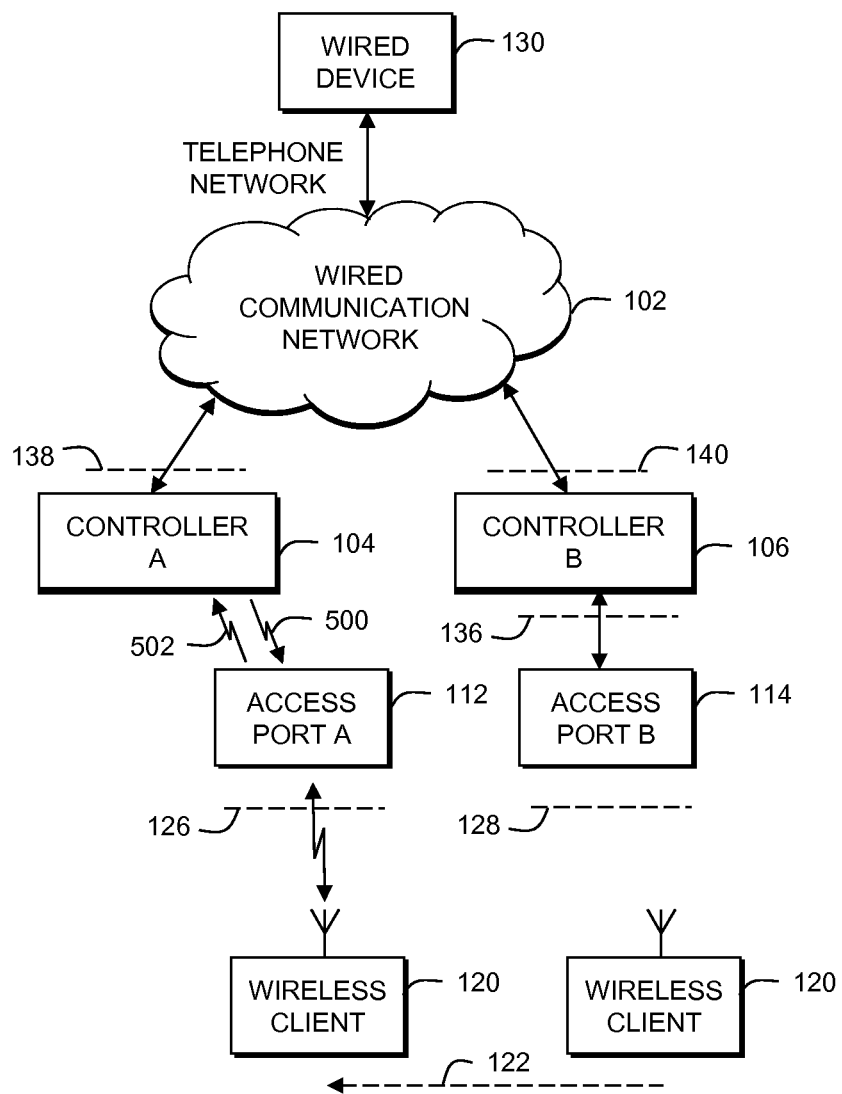
FIG. 5 is a simplified block diagram of still another embodiment, in accordance with the present invention.

Because each controller is applying stateless firewalling of wireless-traffic, it is important that the controller verify if the traffic is really going to wireless clients. Otherwise, some wired host can spoof a WNMP-roam notification and get stateless firewalling through the controller. Although this is not likely to happen, a good protection mechanism is necessary. For example, referring to FIG. 5, a controller 104 can verify the authenticity of the WNMP-roam notification by sending a cookie-based confirmation request 500 packet to the AP 112 that generated the roam notification asking it to confirm if the wireless client is indeed connected/associated on a radio of that AP. On receiving this packet, the AP will check if it has the wireless client in an association table (which every AP maintains) and respond 502 positively or negatively accordingly.

A positive response may also consider the firewall configuration 126 on the AP. For example, if the AP 112 is already doing stateful firewalling for the wireless client 120 it can send a positive response, else negative. If the response is positive, the wireless client 120 will be marked as trusted in the controller binding table. If the response is negative or confirmation request times out, then the wireless client will be marked as untrusted in the controller binding table.

When deciding whether to do stateless firewalling of traffic to/from such a wireless client, the controller can look at the trust value of the wireless client in its binding table. If the wireless client is trusted, only then will the controller do stateless firewalling. Otherwise, if the wireless client is not trusted, the controller will use stateful firewalling to ensure that the firewall policies are not compromised.

In addition, to ensure that these confirmation request themselves are not used as a tool to cause a denial-of-service attack, the confirmation requests will be kept rate-limited and periodic so that every roam does not generate a confirmation request. Further a confirmation request will not be sent for wireless client who was marked as trusted in the binding table at least once.

Each controller can periodically upload their binding table to an independent network entity, such as a current cluster master (not shown). In this way, if it happens that a controller crashes or reboots for some reason, the controller can pull all the information about their wireless clients from the current cluster master to re-build the binding table and be ready for traffic to pass through it without any issues related to stateful flows.

Figure 6:
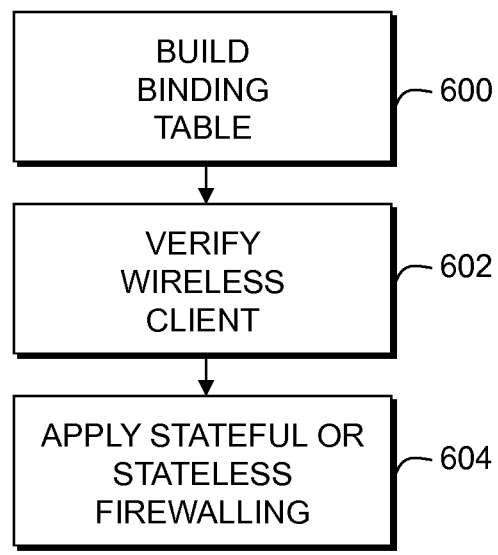
FIG. 6 is a flowchart of a method, in accordance with the present invention.

FIG. 6 illustrates a flowchart of a method for distributed collaborative firewalling in a wireless communication network including a plurality of controllers in a WLAN, in accordance with the present invention. It is envisioned in the examples herein that the communication traffic is tunneled wide area network traffic. The method includes a step 600 of building, by each controller, a binding table listing wireless clients associated with each access port under control of the controller. In particular, this step includes receiving a wireless client identifier for binding to a known access port. The identifier can be a Media Access Control address of the wireless client or a Mesh Interconnection Network Technology header that identifies that a packet is coming from a particular wireless client. The binding table can also include a trust indicator for each wireless client that indicates whether the wireless client is a trusted source.

An optional step 602 includes verifying that wireless communication traffic really corresponds to a wireless client. This can include, in response receiving a wireless client identifier, sending a confirmation request asking for confirmation that a wireless client is properly associated. In response to the confirmation, an appropriate trust value is entered in the binding table. It is preferred that the confirmation request is rate-limited and periodic so that every roam of a wireless client does not generate a confirmation request. Further a confirmation request will not be sent for wireless client who was marked as trusted in the binding table at least once.

A next step 604 includes applying, by each controller, stateless firewalling on wireless communication traffic from a wireless client using the binding table, and applying, by each access port, stateful firewalling on the wireless communication traffic from the wireless client. Stateless firewalling is only applied if the wireless client is not directly associated with an on-board radio of the controller itself. Also, if a wireless client is associated with an AP, and is wirelessly communicating with another device on the same AP, the firewall flow on the AP is stateful. In addition, stateful firewalling is applied for wired devices connected to the controller through a wired communication network. Further, if a wireless client is associated with first AP of a first controller, and is wirelessly communicating with another device associated with a second AP of a second controller B, the firewall flow on both APs is stateful, and the firewall flows on both controllers will be stateless. Also, whenever a wireless client, for which a controller was doing stateless firewalling, roams directly onto an on-board radio or port of the controller, the controller will make all its firewall flows stateful by dropping all stateless firewall flows and installing the migrating stateful firewall flows.

Advantageously, the system and method described herein eliminates the need for firewall flow migration to more than two APs or controllers. The present invention eliminates any call/connection breaks during the mobile client roaming. The approach used builds on information about mobile clients and uses stateless and stateful firewalling based on appropriate needs.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A controller for distributed collaborative firewalling in a wireless wide area communication network including a plurality of controllers, the controller comprising:
    a binding table that is built by the controller in response to receiving identifiers of wireless clients being served by the controller by sending a confirmation request asking for a confirmation that a wireless client is properly associated in order to verify that wireless communication traffic really corresponds to the wireless client, wherein the sending of the confirmation request is rate-limited so that every roam of a wireless client does not generate a confirmation request, the binding table lists the wireless clients properly associated with each access port under control of the controller; and
    a processor coupled to the binding table, the processor operable to apply stateless firewalling on wireless communication traffic from the wireless client using the binding table, and applying, by each access port, stateful firewalling on the wireless communication traffic from the wireless client.

2. The controller of claim 1, wherein the communication traffic is tunneled wide area network traffic that is bridged between wireless and wired devices.

3. The controller of claim 1, wherein the identifier in the binding table is a Media Access Control (MAC) address of the wireless client.

4. The controller of claim 1, wherein the identifier in the binding table is a Mesh Interconnection Network Technology (MINT) header that identifies that a packet is coming from a particular wireless client.

5. The controller of claim 1, wherein stateless firewalling is only applied if the wireless client is not directly associated with an on-board radio of the controller itself.

6. The controller of claim 1, wherein if the wireless client is associated with an AP, and is wirelessly communicating with another device on the same AP, the firewall flow on the AP is stateful.

7. The controller of claim 1, wherein stateful firewalling is applied for wired devices connected to the controller through a wired communication network.

8. The controller of claim 1, wherein if the wireless client is associated with first AP of a first controller A, and is wirelessly communicating with another device associated with a second AP of a second controller B, the firewall flow on both APs is stateful, and the firewall flows on both controllers will be stateless.

9. The controller of claim 1, wherein whenever the wireless client, for which the controller was doing stateless firewalling, roams directly onto an on-board radio or port of the controller, the controller will make all its firewall flows stateful by dropping all stateless firewall flows and installing the migrating stateful firewall flows.

10. The controller of claim 1, wherein the binding table includes a trust value for each wireless client, the trust value is entered in the binding table in response to the confirmation.

11. A machine-implemented method for distributed collaborative firewalling in a wireless wide area communication network including a plurality of controllers, the method comprising the steps of:
   receiving a wireless client identifier for binding to a known access port;
   building, by each controller, a binding table listing wireless clients properly associated with each access port under control of the controller by sending a confirmation request asking for a confirmation that a wireless client is properly associated in order to verify that wireless communication traffic really corresponds to the wireless client, wherein the sending of the confirmation request is rate-limited so that every roam of a wireless client does not generate a confirmation request; and
   applying, by each controller, stateless firewalling on wireless communication traffic from the wireless client using the binding table, and applying, by each access port, stateful firewalling on the wireless communication traffic from the wireless client.

12. The method of claim 11, wherein the binding table includes a trust value for each wireless client, the trust value is entered in the binding table in response to the confirmation.

* * * * *